United States Patent Office 3,106,125
Patented Oct. 8, 1963

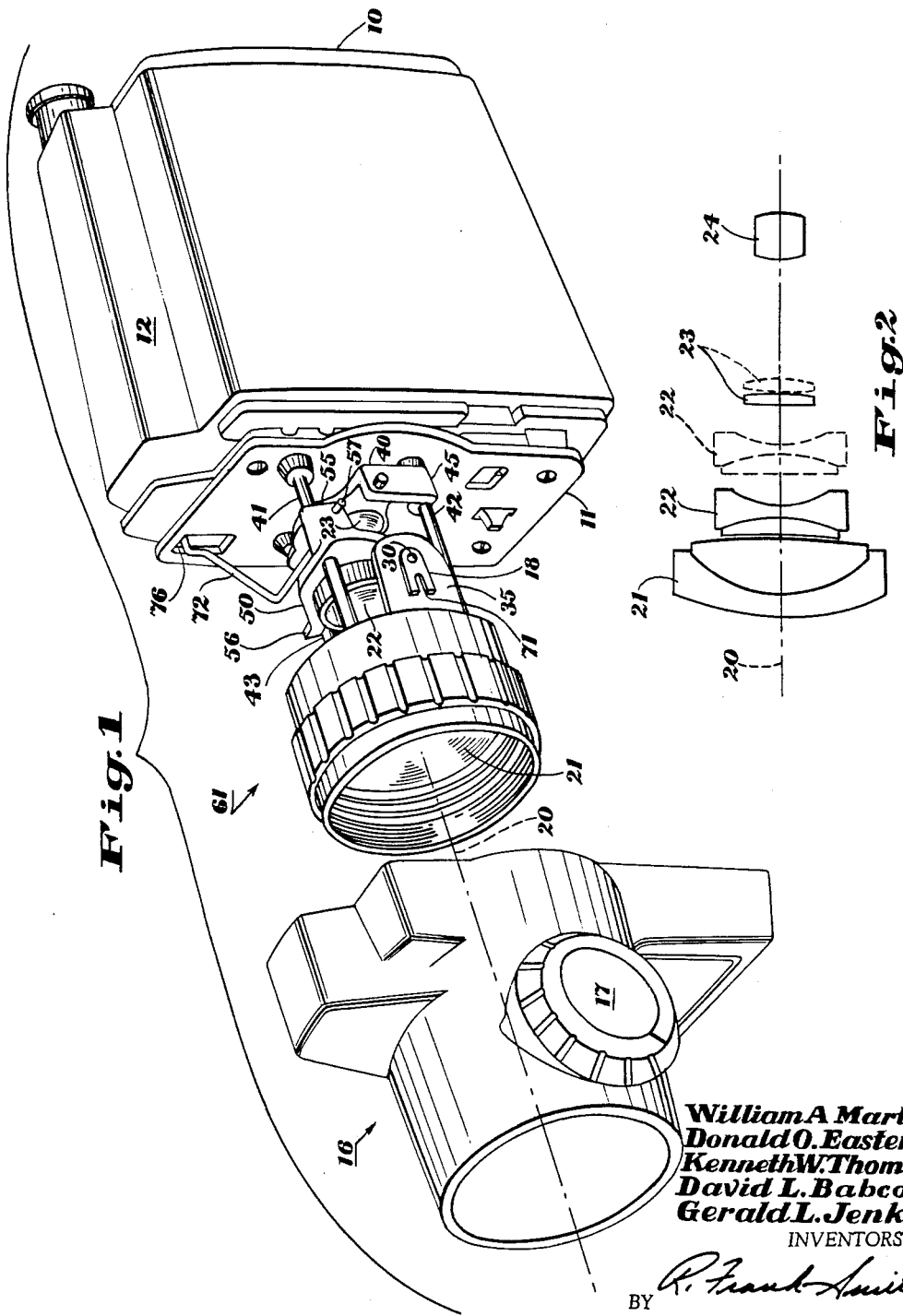

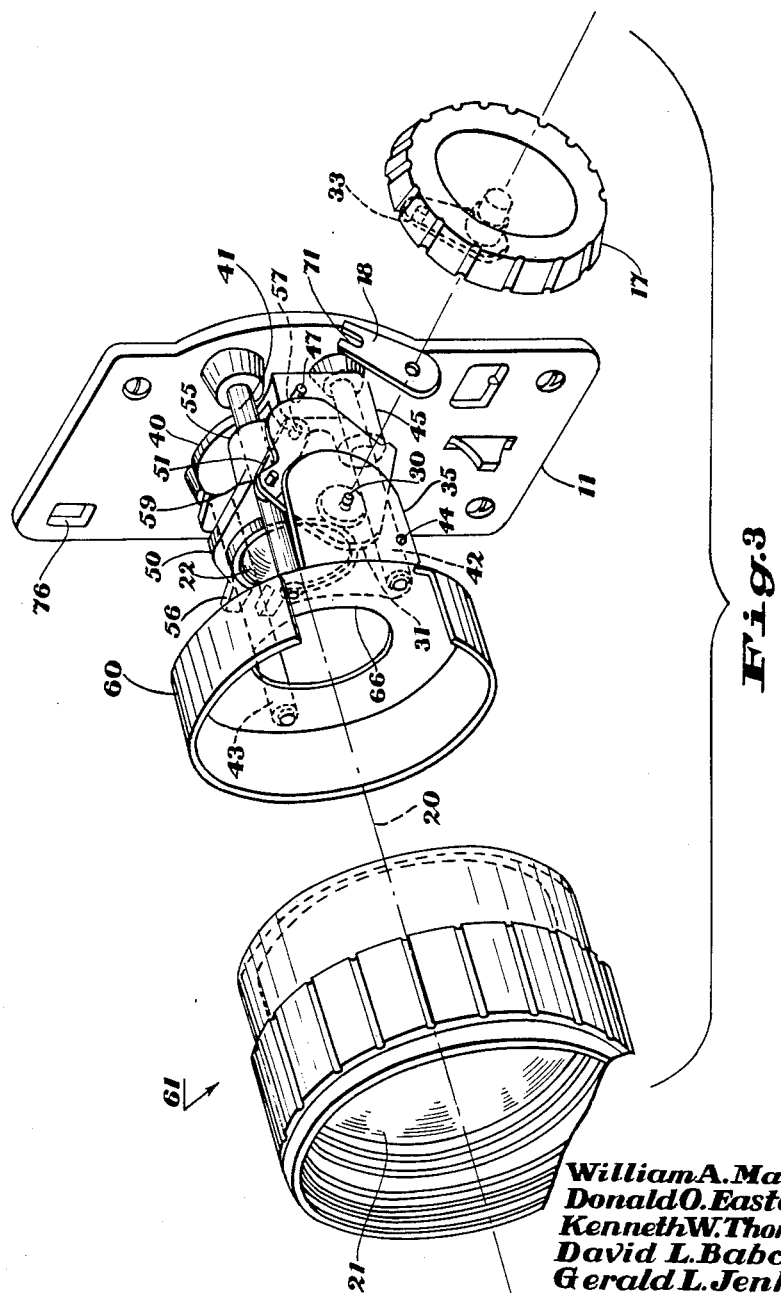

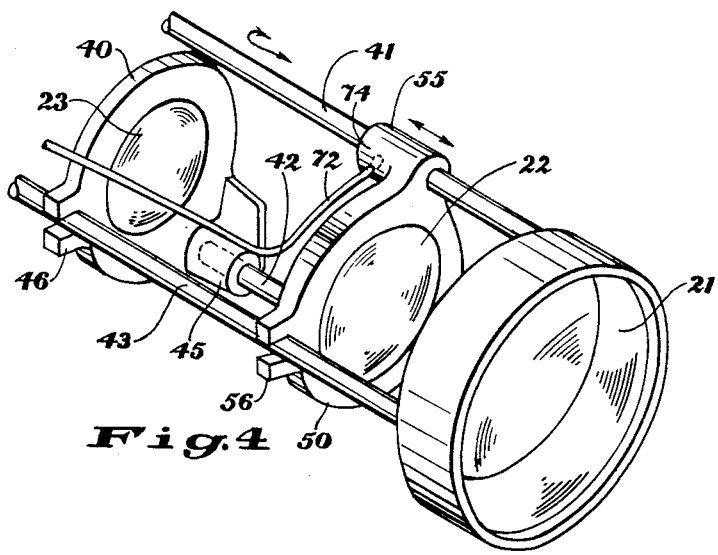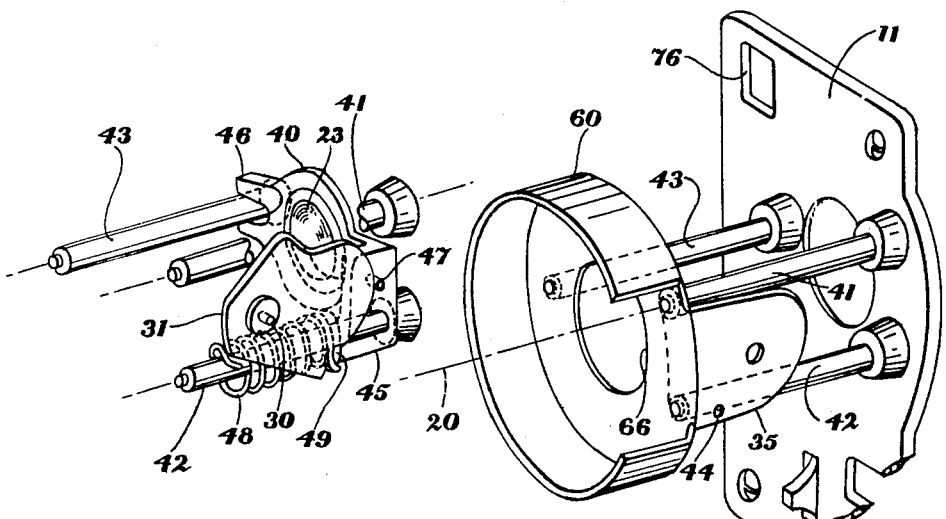

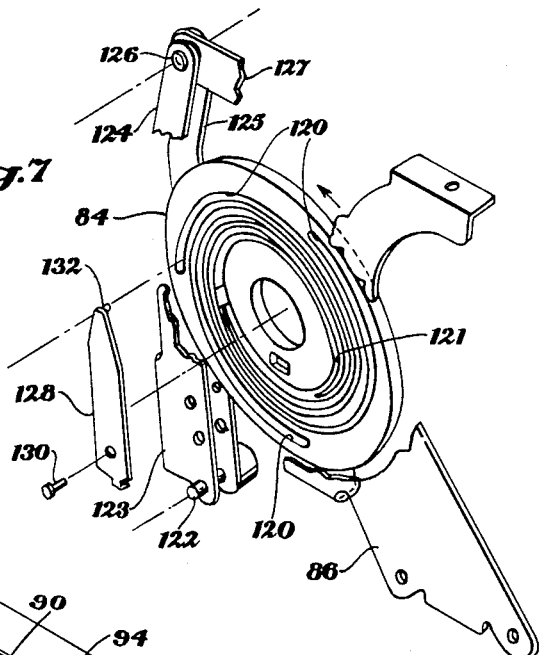
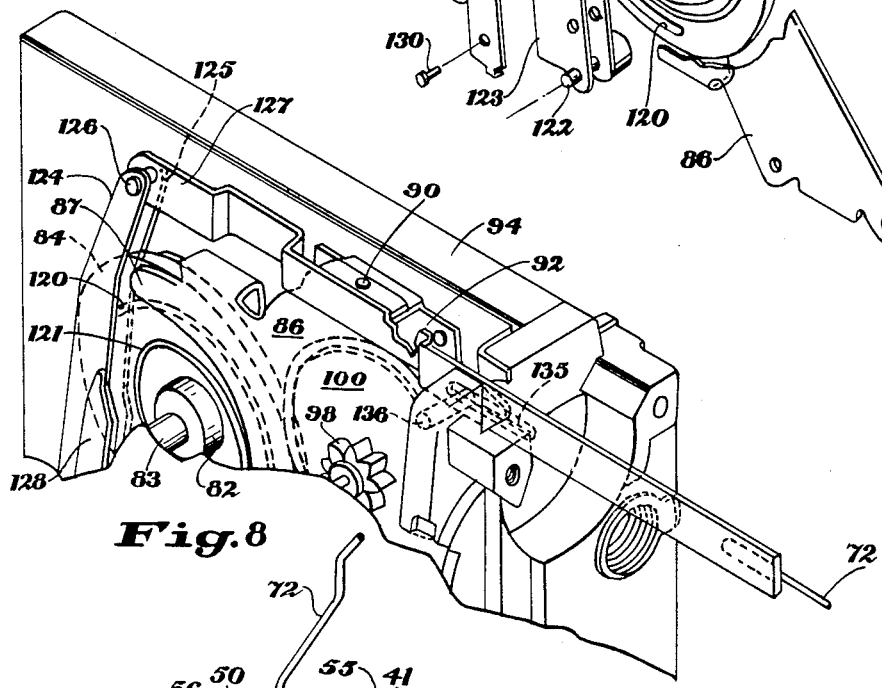
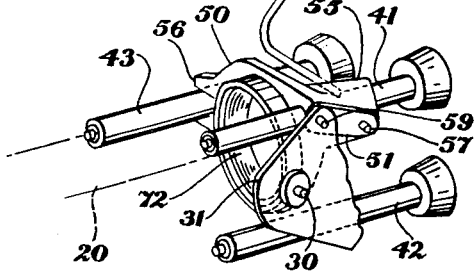

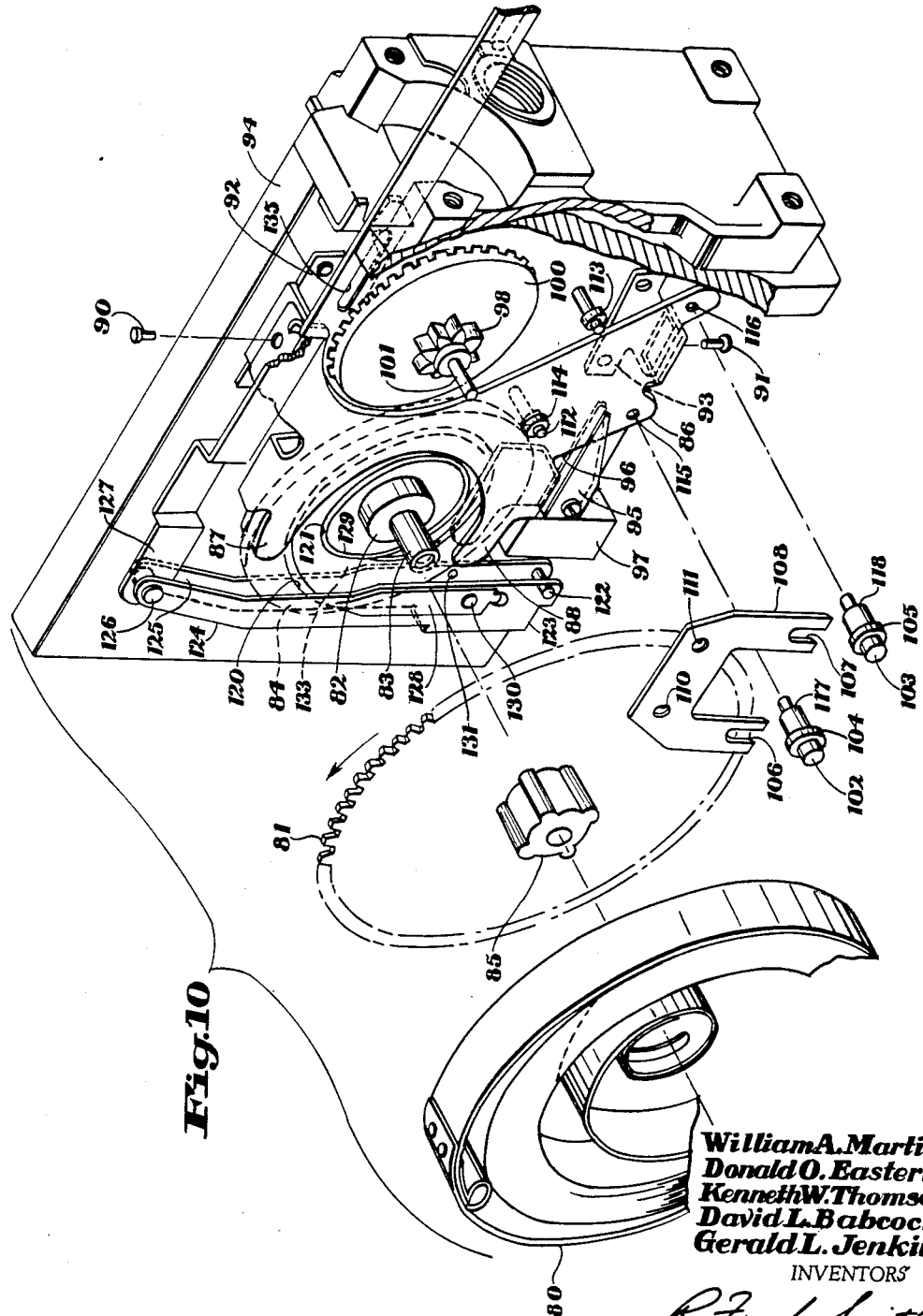

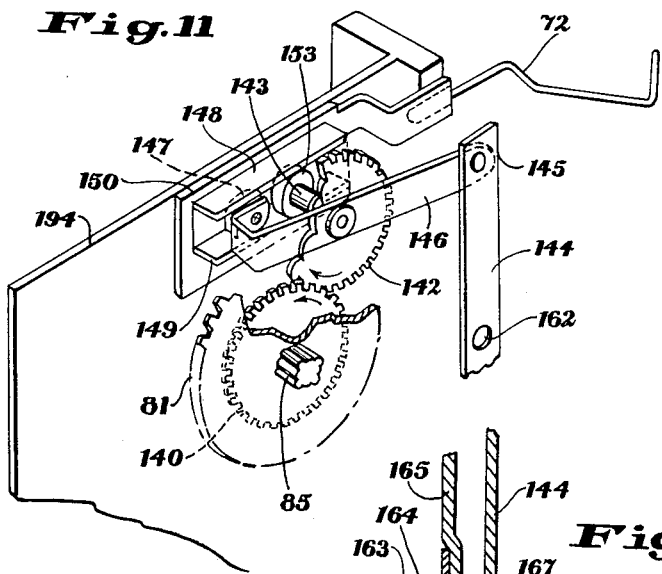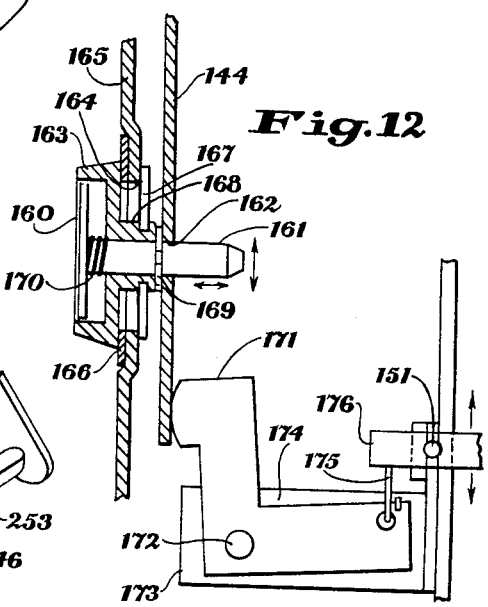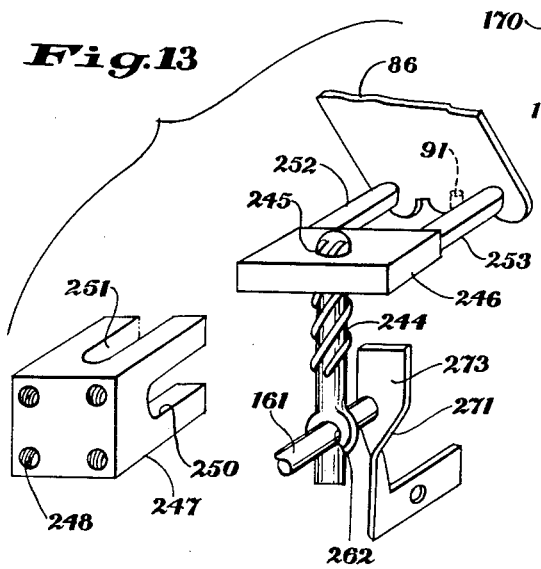

3,106,125
ZOOM LENS DRIVE MECHANISM
William A. Martin, Donald O. Easterly, Kenneth W. Thomson, David L. Babcock, and Gerald L. Jenkins, all of Rochester, N.Y., assignors to Eastman Kodak Company, Rochester, N.Y., a corporation of New Jersey
Filed Aug. 25, 1960, Ser. No. 51,852
4 Claims. (Cl. 88—16)

The present invention concerns photographic cameras having zoom or pancratic lenses and more particularly concerns means for adjusting the zoom lens either with manual power or with power supplied from a camera motor.

The present invention is disclosed in conjunction with a lens system wherein a plurality of lens members are aligned on a common optical axis, including two lens members axially movable for zooming. The mounting and guiding means for each of the two movable lens members is adapted to maintain its respective lens member in precise axial alignment while allowing controlled axial movement for zooming. As the zoom system is adjusted through its range from minimum to maximum magnification, or the reverse, a first movable lens is moved first backward to a rearmost position and then forward again, moving a smaller axial distance than does the second movable lens. The zoom mechanism includes a cam rotatable about an axis transverse to the lens axis, cooperating with a cam follower that is coupled to the mount for the second movable lens. The cam follower is preferably integral with the mount itself but may be linked thereto through a lever. This cam arrangement provides the necessary reciprocating motion of the second lens as the cam is rotated in one direction. Attached to the cam is a crank means coupled to the mount of the first movable lens member for moving the latter continuously in one direction as the cam is rotated in one direction. The shape of the cam and the dimensions of the crank are such that the two movable lens members move so as to maintain the focus of the system constant as the system magnification is changed.

The illustrated zoom lens system comprises three members of which the front one is either fixed or independently adjustable for focusing to different object distances and the other two lens members are movable for zooming, as mentioned above. The mounting and guiding means for the two movable lens members comprise three slide bars or rods parallel to the optical axis and spaced around it; the movable lens members are carried in mounts which slide along these bars and are held in axial alignment by the bars. Each of the two movable lens members is supported primarily by a different slide rod, the third rod providing alignment guidance for both members to prevent rotation of each lens member around its supporting slide rod. This arrangement makes it possible to use a relatively long bearing surface for each lens mount on its own slide rod, thereby to prevent tilting of the lens axis relative to the system axis, and still permits the lenses to be moved close together during zooming. The three slide rods may also support the fixed or non-zooming lenses of the system.

According to the invention the two interrelated movable lens mounts may be driven either manually or by a camera motor. The latter, or motor zoom drive, is coupled by a drive rod to one of the movable lens mounts. The motor zoom drive, in one embodiment, comprises a disk having on each side thereof one or more spiral camming grooves, the grooves on one or the other side of the disk being engageable at any given time by a corresponding one of a pair of cam followers. Both of the cam followers are coupled to the drive rod. The grooved disk is rotated by the camera motor and is moved axially, for engaging one or the other of the cam followers, by one or more manual pushbuttons. The cam grooves are of opposite spiral sense and therefore are adapted to move the drive rod in opposite directions for changing the zoom lens magnification in either direction.

According to a second embodiment of the motor zoom drive, the drive rod is connected to a pair of parallel plates bracketing a roller, which is driven by the camera motor. Manually controlled movement of one or the other plate into engagement with the roller moves the plates and the drive rod in one direction or the other for changing the zoom lens magnification.

It is a primary object of the invention to control the motor drive mechanism for the zoom lens of a camera in either direction of change by means of a single, manually operated member.

A further object of the invention is to control such motor zoom drive by means of the same manually operated member that controls the usual motor drive mechanism for shutter and film advance.

Another object is to adjust a zoom lens on a camera selectively either by manual or by motor power, the former of such modes of adjustment being adapted directly to override the latter.

A further object is to provide an improved power zoom mechanism for a camera.

Other objects of the invention will appear from the following description, reference being made to the accompanying drawings, wherein:

FIG. 1 is a partly exploded perspective view of a zoom lens system according to the invention, mounted on a motion picture camera;

FIG. 2 is a diagrammatic axial section of the optics of a zoom lens system suitable for use with the invention;

FIG. 3 is a partly exploded perspective view of the zoom mechanism with the front cover removed;

FIG. 4 is a detail in perspective of the slide-rod guiding structure for the movable lens mounts;

FIG. 5 is a detail of the cam means and the lens mount movable by cam action;

FIG. 6 is a detail of the slide rods showing the mounting bracket for the front, normally stationary lens member;

FIG. 7 is a partially exploded perspective view of the grooved drive disk employed in a first embodiment of the motor zoom drive;

FIG. 8 is a perspective view of the drive lever and related elements of the first embodiment of the motor zoom drive;

FIG. 9 is a detail of the lens mount movable by crank means;

FIG. 10 is a partially exploded perspective view of the first embodiment of the motor zoom drive;

FIG. 11 is a perspective view of the second embodiment of the motor zoom drive;

FIG. 12 is a front sectional view of the single-button control mechanism for the motor zoom drive of FIG. 11 and other camera elements; and FIG. 13 is a partially exploded perspective view of the single-button control as applied to the first embodiment of the motor zoom drive.

Referring to FIGS. 1, 3 to 6 and 9, the camera body 10 is provided with a front plate 11 on which are mounted three slide bars or rods 41, 42 and 43. Along the top of the camera may be mounted a telescopic reflex viewfinder, indicated generally at 12, the axis of which is reflected downward and into coincidence with the optical axis 20 of the zoom system in any well known manner.

On the three slide rods are mounted the two zooming lens members in mounts 40 and 50, respectively. Attached to the front ends of the three slide rods is a bracket 60, shown in more detail in FIG. 6, for the usual focusing lens and ring 61. The bracket 60 has a turned ear 35 to provide support for a transverse mechanical axis 30 of the zoom operating mechanism. When the zoom mechanism is completely assembled, a cover 16 is placed in position and a manual control knob 17 is attached to the cover and fastened to an operating lever 18.

FIG. 2 is a diagrammatic axial section of a particular lens system suitable for use with the mechanical mount and control according to the invention. A front positive member 21, which may be a cemented achromatic doublet, is normally stationary but is movable for focusing and for manufacturing adjustment. A negative member 22, which also may be a cemented achromatic doublet, is in the position shown in full lines when the system is adjusted for minimum magnification and in the position shown in broken lines when adjusted for maximum magnification. A third member 23 is a positive single lens and is in the position shown in full lines when at or near either end of the range of adjustment or magnification and in the position shown in broken lines when adjusted for an intermediate magnification. These lens members are mounted in front of a standard objective 24 and all are in optical alignment on the optical axis 20. The objective lens is focused approximately for its hyperfocal distance before the afocal zoom system is assembled in front of it.

Slide rods 41, 42 and 43 are supported by the front plate 11 of the camera. Mount 40 for the rear movable lens member 23 of the zoom system is slidably mounted on rods 42 and 43, while mount 50 for the front movable lens member 22 of the zoom system is slidably mounted on rods 41 and 43. Each mount is provided with a respective sleeve 45 and 55 by which it is mounted on rod 42 or 41. Sleeves 45 and 55 are of sufficient length to prevent tilting of the respective mounting members. Each sleeve is provided with a respective yoke 46 and 56 sliding on rod 43 for preventing rotation around the other rod. These yokes can be made thin so that the two movable lens mounts can approach quite close to one another.

The control mechanism includes a cam plate 31 mounted for rotation, along with a transverse axial pin 30, through an angle of approximately 110°, under the control of the manually operated knob 17. For ease in assembly, a clip or yoke member 18 (FIGS. 1 and 3) is mounted rigidly on pin 30 so that the pin and clip turn together. Knob 17 is provided with an eccentric pin 33, which is inserted into a notch 71 of the yoke during assembly, permitting knob 17 to be used for turning the cam plate.

FIG. 5 shows the mechanism for moving the rear movable lens mount 40. A pin or roller 47 is mounted on lens mount 40 and bears against the edge of cam plate 31 for imparting the predetermined motion to the rear lens mount during zooming. In order to urge the pin 47 against the cam plate 31 resiliently, a spring 48 is wound around rod 42 and has one end attached to a boss 49 on the sleeve portion 45 of the rear lens mount. The other end of spring 48 is secured in a hole 44 in the ear 35 on mounting bracket 60, as shown in FIGS. 3 and 6. The spring is stretched during assembly of the apparatus and put under tension to supply the force for holding the pin 47 against cam plate 31.

FIG. 6 is a perspective view of the framework of the zoom lens mechanism with the two movable lens mounts removed. The mounting bracket 60 for the front lens member is mounted on the front ends of the three slide rods 41, 42 and 43 by riveting or in any other convenient way. This mounting bracket is a generally cup-shaped member, which conveniently may be punch-pressed out of sheet metal and is provided with a central aperture 66 in the bottom of the cup, through which the image-forming beam of light passes. One sector of the rim portion of the cup is separated from the remainder of the rim portion and is turned back in the opposite direction to form the mounting tab 35 for the transverse pin 30. The front lens mount 61 (FIG. 3) is supported by the mounting bracket 60 in any known manner, for example in threading engagement, to provide axial movement for focusing.

FIG. 9 shows the mechanism for moving the front movable lens mount 50. This lens mount is not under spring tension but is positively moved in both directions by a link 51, which is attached at one end to the sleeve 55 of the lens mount by means of a pin 57 and at the other end to the cam plate 31 by means of a pin 59. When the cam plate is turned about its axis 30 by turning knob 17 (shown in FIG. 3), link 51 is pulled or pushed and it in turn pulls or pushes lens mount 50 through the required range and reaches a positive stop at each end of the range when the sleeve 55 reaches each end of the rod 41. For ease in designing cam 31, pin 47 (FIG. 3) preferably is located in the same horizontal plane as the transverse axis 30.

The above described zoom mechanism may be operated not only by manual power, through the turning of knob 17 (FIG. 3), but also by motor power. For the latter type of drive a rod 72 has one end secured in a recess 74 (FIG. 4) in sleeve 55 of lens mount 50. Rod 72 extends through an aperture 76 in plate 11 (FIG. 1) for cooperation with the motor zoom drive mechanism, described below, which moves rod 72 forward or backward to adjust the zoom lens magnification.

A first embodiment of the motor zoom drive is shown in FIGS. 7, 8 and 10. A camera motor, which is illustrated as a spring motor but may be an electric motor, transmits its torque to a gear 81 through a splined hub 85 engaging motor 80. Gear 81 drives various camera mechanisms such as the shutter, the pull-down and film wind (not shown), through a pinion gear 98 and a face gear 100 mounted on a shaft 101, which is supported in a well known manner on a mechanism plate 94. Loosely mounted on a hub 82 of a gear shaft 83 is a disc 84, shown best in FIG. 7, constituting a portion of a drive transmission means. A yoke 86, constituting a portion of a drive control or selection means, has upper and lower brackets 87 and 88 diametrically opposed to each other across the gear axis and straddling disc 84 for limiting axial movement of the latter along hub 82. Yoke 86 is pivoted on a vertical axis about a pair of pins 90 and 91, which are supported in brackets 92 and 93, respectively. Brackets 92 and 93 are mounted on mechanism plate 94. A pair of leaf springs 95 and 96 are secured to an extension 97 of the mechanism plate 94 and straddle yoke 86 to maintain it and disc 84 parallel to the plane of gear 81.

A pair of manual actuating devices comprise push buttons 102 and 103 having respective collars 104 and 105 engaging the inner peripheries of corresponding slots 106 and 107 of leaf spring 108. This spring is mounted through a pair of holes 110 and 111 on respective collared rivets 112 and 113, which are secured to mechanism plate 94 and hold spring 108 in spaced relation to the mechanism plate. Rivet 112 extends through an aperture 114 in yoke 86 into engagement with spring 108. The inner tip of each push button 102 and 103 extends through a corresponding hole 115 or 116 in yoke 86 so that respective shoulders 117 or 118 on each push button bear against the yoke. When push button 102 is depressed, i.e., moved to the right as shown in FIG. 10, it tensions the lefthand arm of spring 108 and rocks yoke 86 clockwise about pivots 90 and 91 against the tension of spring 96, thereby moving disc 84 axially away from gear 81. Depression of push button 103 produces the opposite result in a similar manner and moves disc 84 axially toward gear 81.

On the face of disc 84 toward gear 81 are one or more righthand spiral grooves 120 shown best in FIG. 7, where the disc is illustrated as having three such grooves. In order to simplify the drawings only one groove is shown in FIG. 8 and in FIG. 10. Grooves 120 are substantially 360° long and teminate in a circular groove 121 at their smallest radii. On the opposite face of disc 84 (not shown) is a corresponding set of lefthand spiral grooves and a terminal central groove.

Mounted on a pivot 122, which is secured to the mechanism plate 94, is a lever 123 having spaced parallel arms 124 and 125 straddling the rear edge of disc 84. The upper ends of lever arms 124 and 125 are coupled by a spacing pin 126, in which is secured one end of a lever 127 constituting a portion of drive means for the movable lens mounts. Lever 127 is guided for horizontal sliding movement by a slot 135 engaging a pin 136 (FIG. 8) which is secured to the mechanism plate 94. The previously described drive rod 72 is connected to the other, the forward end of lever 127. Leaf springs 128 and 129 are riveted at 130 and 131 to arms 124 and 125, respectively, of lever 123 and have pins 132 (FIG. 7) and 133 (FIG. 10) extending through aligned apertures in lever arms 124 and 125 for engagement with the grooves in corresponding faces of disc 84.

When the camera motor is running and the right hand push button 103 is depressed, disc 84 is moved toward lever arm 124 and pin 132 enters one of the spiral grooves 120, thereby moving the driving lever 127 and rod 72 toward the camera front, as shown in FIG. 8, which moves lens mount 50 (FIG. 2) forward toward the wide-angle position. Releasing push button 103 disengages pin 132 (FIG. 7) from groove 121 and permits spring 96 (FIG. 10) to center yoke 86 about its pins 90 and 91, thereby leaving the lens system in its desired adjustment. If push button 103 is held depressed until the drive lever 127 has traveled to its maximum forward position, pin 132 enters circular groove 121 to prevent further forward movement of the drive lever 127 and thereby prevents damage to the driving and lens-mount mechanisms. If pin 132 does not enter one of the spiral grooves immediately upon depression of the push button 103, spring 128 yields and permits pin 132 to ride on the face of disc 84 until the next groove rides under the pin.

For changing the zoom mechanism in the opposite direction (toward the telephoto setting as shown in FIG. 10), push button 102 is depressed, thereby moving disc 84 into engagement with pin 133 (FIG. 10) on spring 129. The operation in this case is similar to, but reversed from, the above described operation under control of push button 103.

In a second embodiment of the motor zoom drive, illustrated in FIG. 11, a gear 140 is secured to and coaxial with the main drive gear 81 and continuously drives a gear 142, which is mounted for rotation on a shaft 143 projecting from the mechanism plate 194. A lever 144, which may be moved up or down as hereinafter described, is pivotally connected at 145 to a control lever 146. The control lever is pivoted on shaft 143 and has a U-shaped end carrying a roller 147 cooperating with upper and lower channel plates 148 and 149, which are intergral with a driving lever 150. The driving lever is guided for horizontal sliding movement by a roller 153, which is integral with the continuously driven shaft 143, and by the drive rod 72, which is connected to the righthand end of lever 150 for operating the movable zoom lens mounts 40 and 50.

When lever 144 is raised, lever 146 is moved counterclockwise (as shown in FIG. 11) thereby lowering roller 147 to force channel plate 148 into frictional engagement with the top of roller 153. This forces lever 150 and drive rod 72 to the right toward wide-angle adjustment of the lens system. Similarly, downward movement of lever 144 causes leftward movement of drive rod 72 toward telephoto adjustment of the lens system, by forcing the lower channel plate 149 into frictional engagement with the bottom surface of roller 153. It will be evident that the foregoing motor zoom drive, which includes a frictional coupling between roller 153 and drive lever 150, can be overridden by the manual drive knob 17 (FIGS. 1 and 3), for example by holding knob 17 stationary during attempted motor drive.

Referring to FIGS. 11 and 12, lever 144 may be raised and lowered by means of a single push button 160 having a shaft 161 engaging an aperture 162 in lever 144. Push button 160 is mounted in a recessed holder 163, which in turn is mounted for vertical sliding motion in a slot 164 in an outer wall 165 of the camera. A fixed ring 166 separates the inner face of holder 163 from the outer surface of wall 165. A washer 167 is staked onto a hub 168 in a hub of holder 163 and has an outer face engaging the inner surface of the camera wall 165 around aperture 164 to restrain the holder against axial movement relative to the camera wall. A C-ring 169 is keyed to shaft 161 and separates holder 163 from lever 144. A spring 170 urges push buton 160 outwardly and may be overcome by manual pressure on the push button. It will be seen that push buton 160 may be moved manually up or down to operate the motor zoom drive shown in FIG. 11. This same push button may also be employed for operating the camera motor as follows:

Inward movement of push button 160 causes C-ring 169 to force the lower end of lever 144 to the right as viewed in FIG. 12. This end of lever 144 bears against a bell crank 171 pivoted at 172 on a frame member 173. An arm 174 of the bell crank is attached by a wire 175 to the usual motor operating member, or camera release lever 176, pivoted at 151, by which the camera motor is operated. Therefore, depression of push button 160 rocks bell crank 171 clockwise about its pivot 172 and pulls the release lever downward to operate the camera motor. It will be seen that push button 160 may be moved up or down while it is held depressed, so that the zoom lens magnification may be changed in either direction while the camera is operating. It also will be seen that the single push button 160 may be employed both for changing the zoom magnification and for operating the camera. Therefore, pushbutton 160 can be moved selectively through three loci or paths; the first being from the neutral outward position inwardly and either upward or downward to actuate the motor-operating member or camera release lever 176 prior to movement of lever 144 for establishing the forward or reverse coupling mode of transmission means comprising roller 153 (FIG. 11) and plates 148 and 149; the second being from the neutral outward position either upward or downward for establishing the coupling mode and then inwardly to actuate the motor-operating member 176; and the third being common to a portion of the first locus in that pushbutton 160 is only moved inwardly from the neutral position to actuate the motor-operating member 176. The three loci permit the operator to control the actuation of the zoom lens system at any stage of the exposure; that is, with initial actuation of lever 144 and then actuation of lever 176 by means of the first locus, with initial actuation of lever 176 and then lever 144 by the second locus, and with initial release of lever 176 by the third locus for normal film exposure and movement of the pushbutton 160 at any subsequent time either upward or downward to complete the second locus for actuating lever 144.

A modification of lever 144 of FIG. 11, shown as a steeply threaded rod 244 in FIG. 13, has an aperture 262 adapted to receive the shaft 161 of push button 160 (FIG. 12). Rod 244 is adapted to engage a threaded hole 245 in a control block 246, which is restrained from vertical motion by an anchor member 247, secured to a frame member at 248. The anchor member 247 has a horizontal slot 250 adapted to receive block 246 and has vertical slots 251 adapted to receive rod 244. Vertical movement of shaft 161, as hereinbefore described, causes block 246 to turn about rod 244. This block has a pair of arms 252 and 253 cooperating with yoke 86 (FIGS. 8 and 10) on opposite sides of pivot 91 of that yoke. Angular movement of block 246 therefore rocks yoke 86 about its pivot for adjusting the zoom magnification as previously described in relation to FIGS. 8 and 10. Depression of the push button at any of its vertical positions pushes shaft 161 further through aperture 262 of rod 244. The end of shaft 161 engages a flat surface 273 of a bell crank 271, which operates like bell crank 171 of FIG. 12 for controlling the camera motor. From the foregoing it will be seen that the single push button 160 (FIG. 12) may be employed for either of the motor zoom drive mechanisms disclosed above.

The invention has been described in detail with particular reference to preferred embodiments thereof, but it will be understood that variations and modifications can be effected within the spirit and scope of the invention as described hereinabove and as defined in the appended claims.

We claim:

1. In a photographic camera having a drive motor with an operating member therefor, and having a taking-lens system including at least one lens element mounted for axial movement in said camera for varying the magnification of said lens system, means for imparting bidirectional axial drive to said lens element, comprising in combination: movable drive means coupled to said lens element and adapted, upon movement of said drive means in either of two directions, for driving said lens element in a corresponding one of two axial directions; transmission means adapted to couple said motor to said drive means in either of forward and reverse modes for moving said drive means in respective ones of its two directions in response to unidirectional operation of said motor; a manual actuating device disposed in cooperative relation with said transmission means and with said motor-operating member and selectively movable in either of first and second nonintersecting loci for establishing the respective forward and reverse coupling modes of said transmission means and for actuating said motor-operating member prior to and subsequent to establishment of said coupling modes, respectively, to vary the magnification of said lens system with power supplied by said motor and in a third locus which is common to a portion of said first locus for actuating only said motor-operating member.

2. The combination defined in claim 1, wherein said transmission means includes: a pair of cams coupled to said motor and driven unidirectionally thereby; a pair of cam followers connected to said drive means and adapted to engage respective ones of said cams for moving said drive means in respective ones of its two directions; and means controlled by said actuating device for selectively engaging either of said followers with its corresponding cam surface in response to movement of said actuating device to respective ones of its first and second loci.

3. The combination defined in claim 1, wherein said transmission means includes: a friction roller coupled to said motor and driven thereby unidirectionally about an axis; a pair of plates connected to said drive means on opposite sides of said roller axis and adapted for individual frictional engagement with said roller for moving said drive means in respective ones of its two directions; and means controlled by said actuating device for selectively engaging either of said plates with said roller in response to movement of said actuating device to respective ones of its first and second loci.

4. In a photographic camera having a drive motor, and having a taking-lens system including at least one lens element mounted for axial movement in said camera for varying the magnification of said lens system, means for imparting bidirectional axial drive to said lens element, comprising in combination: movable drive means coupled to said lens element and adapted, upon movement of said drive means in either of two directions, for driving said lens element in a corresponding one of two axial directions; transmission means adapted for reversibly coupling said motor to said drive means, including a pair of cams driven unidirectionally by said motor, and a pair of cam followers connected to said drive means and adapted to engage respective ones of said cams for moving said drive means in respective ones of its two directions in response to unidirectional operation of said motor; and manual actuating means coupled to said transmission means for selectively engaging either of said cams with its corresponding follower.

References Cited in the file of this patent
UNITED STATES PATENTS

| 1,950,166 | Durholz | Mar. 6, 1934 |
| 2,185,849 | Humeston | Jan. 2, 1940 |
| 2,782,683 | Walker | Feb. 26, 1957 |
| 2,924,146 | Back | Feb. 9, 1960 |
| 2,995,061 | Briskin et al. | Aug. 8, 1961 |

FOREIGN PATENTS

| 813,139 | Great Britain | May 6, 1959 |